(12) United States Patent
Laaksonen et al.

(10) Patent No.: US 12,143,807 B2
(45) Date of Patent: Nov. 12, 2024

(54) SPATIAL AUDIO (71) Applicant: Nokia Technologies Oy, Espoo (FI)

(72) Inventors: Lasse Juhani Laaksonen, Tampere (FI); Arto Juhani Lehtiniemi, Lempaala (FI); Miikka Tapani Vilermo, Siuro (FI); Jussi Artturi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 216 days.

(21) Appl. No.: 17/802,750

(22) PCT Filed: Feb. 17, 2021

(86) PCT No.: PCT/EP2021/053821
§ 371 (c)(1),
(2) Date: Aug. 26, 2022

(87) PCT Pub. No.: WO2021/170459
PCT Pub. Date: Sep. 2, 2021

(65) Prior Publication Data
US 2023/0116646 A1 Apr. 13, 2023

(30) Foreign Application Priority Data
Feb. 28, 2020 (EP) .................................. 20160037

(51) Int. Cl.
*H04S 7/00* (2006.01)
*G06F 3/16* (2006.01)

(52) U.S. Cl.
CPC ............ *H04S 7/307* (2013.01); *G06F 3/165* (2013.01); *H04S 2400/11* (2013.01); *H04S 2400/13* (2013.01)

(58) Field of Classification Search
None
See application file for complete search history.

(56) References Cited

U.S. PATENT DOCUMENTS

| 2010/0223552 | A1  | 9/2010 | Metcalf .................... 715/716 |
| 2012/0039477 | A1* | 2/2012 | Schijers ............... G10L 19/008 381/22 |
| 2015/0237454 | A1* | 8/2015 | Scheirer ................... H04S 7/30 381/17 |
| 2017/0195819 | A1  | 7/2017 | Harder et al. |
| 2018/0240470 | A1* | 8/2018 | Wang .................. G10L 19/008 |
| 2019/0149919 | A1  | 5/2019 | Mate et al. |
| 2019/0174246 | A1* | 6/2019 | De Bruijn ............... G06F 3/012 |

FOREIGN PATENT DOCUMENTS

| EP | 3236345 A1 | 10/2017 |
| EP | 3264802 A1 | 1/2018 |
| EP | 3443762 A1 | 2/2019 |

* cited by examiner

*Primary Examiner* — Qin Zhu
(74) *Attorney, Agent, or Firm* — Harrington & Smith (57) ABSTRACT

An apparatus comprising means including circuitry configured for: applying equalization to a sub-set of a plurality of spatial sound sources, included in a sound scene, to modify the sound scene, wherein spatial sound sources are associated with respective locations in the sound scene, wherein equalization includes frequency-dependent level adaptation, and wherein the sub-set includes multiple spatial sound sources but does not include all of the plurality of spatial sound sources.

12 Claims, 5 Drawing Sheets

SPATIAL AUDIO

CROSS REFERENCE TO RELATED APPLICATION

This patent application is a U.S. National Stage application of International Patent Application Number PCT/EP2021/053821 filed Feb. 17, 2021, which is hereby incorporated by reference in its entirety, and claims priority to EP 20160037.6 filed Feb. 28, 2020.

TECHNOLOGICAL FIELD

Embodiments of the present disclosure relate to spatial audio.

BACKGROUND

Spatial audio describes the capturing/processing/rendering of audio where the audio comprises spatial sound sources 20 at particular locations 22 in a sound scene 10.

BRIEF SUMMARY

According to various, but not necessarily all, embodiments there is provided an apparatus comprising means for:

applying equalization to a sub-set of a plurality of spatial sound sources, comprised in a sound scene, to modify the sound scene, wherein spatial sound sources are associated with respective locations in the sound scene, wherein equalization comprises frequency-dependent level adaptation, and wherein the sub-set comprises multiple spatial sound sources but does not comprise all of the plurality of spatial sound sources.

In some but not necessarily all examples, the means for applying equalization to the sub-set of the plurality of spatial sound sources is configured to apply a common equalization to the sub-set of spatial sound sources.

In some but not necessarily all examples, the sub-set of the plurality of spatial sound sources is selected from the plurality of spatial sound sources in dependence upon a user input.

In some but not necessarily all examples, the user input comprises:

an indication of a spatial sound source or a location;
an indication of frequency; and, optionally,
an indication of emphasis or de-emphasis.

In some but not necessarily all examples, the user input indicates directly or indirectly a spatial sound source having a first characteristic, and wherein the apparatus comprises means for selecting the sub-set of the plurality of spatial sound sources to have the first characteristic.

In some but not necessarily all examples, the first characteristic is that the spatial sound source has a frequency-specific volume greater than a threshold value.

In some but not necessarily all examples, the apparatus comprises means for spatially re-distributing sound energy to spatially compensate for equalization of the sub-set of spatial sound sources.

In some but not necessarily all examples, the apparatus comprises means for adapting one or more characteristics of the first spatial sound source and/or adapting one or more characteristics of one or more of the plurality of spatial sound sources that are not comprised in the sub-set of the plurality of spatial sound sources.

In some but not necessarily all examples, the apparatus comprises means for adapting one or more spatial sound sources in the sub-set of the plurality of spatial sound sources to make them more diffuse.

In some but not necessarily all examples, the apparatus comprises means for adapting one or more of the plurality of spatial sound sources that are not in the sub-set of the plurality of spatial sound sources to make the one or more sound sources less diffuse and/or to change a location of the one or more spatial sound sources.

In some but not necessarily all examples, the apparatus comprises means for representing spatial sound sources as respective spatially located time-frequency tiles, and means for preventing a time-frequency tile from becoming spatially separated or distinct from other contemporaneous time-frequency tiles of the same spatial sound source; and/or preventing spatial overlap of a distinctly located time-frequency tile with other distinctly located contemporaneous time-frequency tiles of other spatial sound sources.

In some but not necessarily all examples, the apparatus comprises means for capturing and/or processing and/or rendering the sound scene comprising the plurality of spatial sound sources, wherein spatial sound sources are associated with respective locations in the sound scene.

In some but not necessarily all examples, the apparatus is configured as headphones, a controller for loudspeakers, or a spatial sound capturing device.

According to various, but not necessarily all, embodiments there is provided a method comprising:

applying equalization to a sub-set of a plurality of spatial sound sources, comprised in a sound scene, to modify the sound scene, wherein spatial sound sources are associated with respective locations in the sound scene, wherein equalization comprises frequency-dependent level adaptation, and wherein the sub-set comprises multiple spatial sound sources but does not comprise all of the plurality of spatial sound sources.

According to various, but not necessarily all, embodiments there is provided a computer program that, when run on a computer, enables:

applying equalization to a sub-set of a plurality of spatial sound sources, comprised in a sound scene, to modify the sound scene, wherein spatial sound sources are associated with respective locations in the sound scene, wherein equalization comprises frequency-dependent level adaptation, and wherein the sub-set comprises multiple spatial sound sources but does not comprise all of the plurality of spatial sound sources.

According to various, but not necessarily all, embodiments there is provided an apparatus comprising means for:

applying equalization to at least one of a plurality of spatial sound sources, comprised in a sound scene, to modify the sound scene, wherein spatial sound sources are associated with respective locations in the sound scene;

wherein equalization comprises a frequency-dependent level filter, spatially re-distributing sound energy to spatially compensate for equalization of the at least one of the plurality of spatial sound sources.

In some but not necessarily all examples, the means for applying equalization to at least one of a plurality of spatial sound sources is configured to apply equalization to all of the plurality of spatial sound sources. In some but not necessarily all examples, the means for applying equalization to at least one of a plurality of spatial sound sources is configured to apply equalization to only one of the plurality of spatial sound sources. In some but not necessarily all examples, the means for applying equalization to at least one of a plurality of spatial sound sources is configured to apply equalization to a sub-set of the plurality of spatial sound sources, wherein the sub-set comprises multiple spatial sound sources but does not contain all of the plurality of spatial sound sources.

According to various, but not necessarily all, embodiments there is provided a method comprising:

applying equalization to at least one of a plurality of spatial sound sources, comprised in a sound scene, to modify the sound scene, wherein spatial sound sources are associated with respective locations in the sound scene;

wherein equalization comprises a frequency-dependent level filter, spatially re-distributing sound energy to spatially compensate for equalization of the at least one of the plurality of spatial sound sources.

According to various, but not necessarily all, embodiments there is provided a computer program that, when run on a computer, enables:

applying equalization to at least one of a plurality of spatial sound sources, comprised in a sound scene, to modify the sound scene, wherein spatial sound sources are associated with respective locations in the sound scene;

wherein equalization comprises a frequency-dependent level filter, spatially re-distributing sound energy to spatially compensate for equalization of the at least one of the plurality of spatial sound sources.

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

The Figures illustrate controlled equalization for spatial audio.

Spatial audio describes the capturing/processing/rendering of audio where the audio content comprises spatial sound sources 20 at particular locations 22 in a sound scene 10. The locations can, for example, be defined using a two-dimensional position (e.g. (x, y)) or a three dimensional position (e.g. (x, y, z)) or can for example be defined using a one-dimensional bearing (e.g. azimuthal angle $\phi$) or a two-dimensional bearing (e.g. azimuthal and polar angles $\theta$, $\phi$).

A spatial sound source 20 has a level (volume). Applying equalization to a spatial sound source 20 comprises frequency-dependent level adaptation. The spatial sound source 20 has different levels for different frequencies, and equalization adapts one or more of those levels. Equalization adjusts a balance between levels of frequency components of spatial sound sources 20. The equalization can, for example, be discrete and change a level for each one of a number of fixed (or variable) frequency bands or can for example, define a center frequency and bandwidth.

Figure 1A:
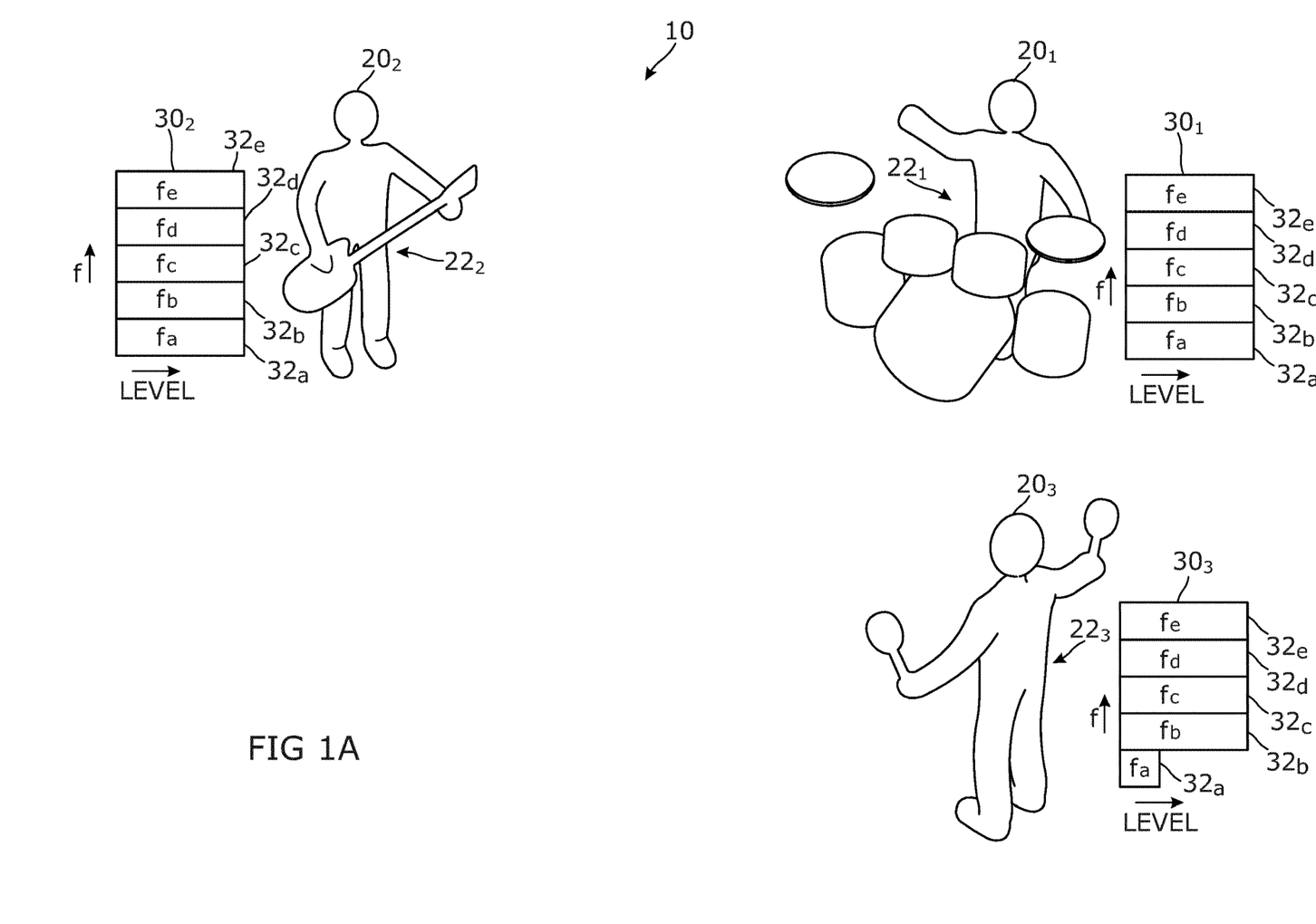
FIGS. 1A and 1B show an example embodiment of the subject matter described herein.
Figure 1B:
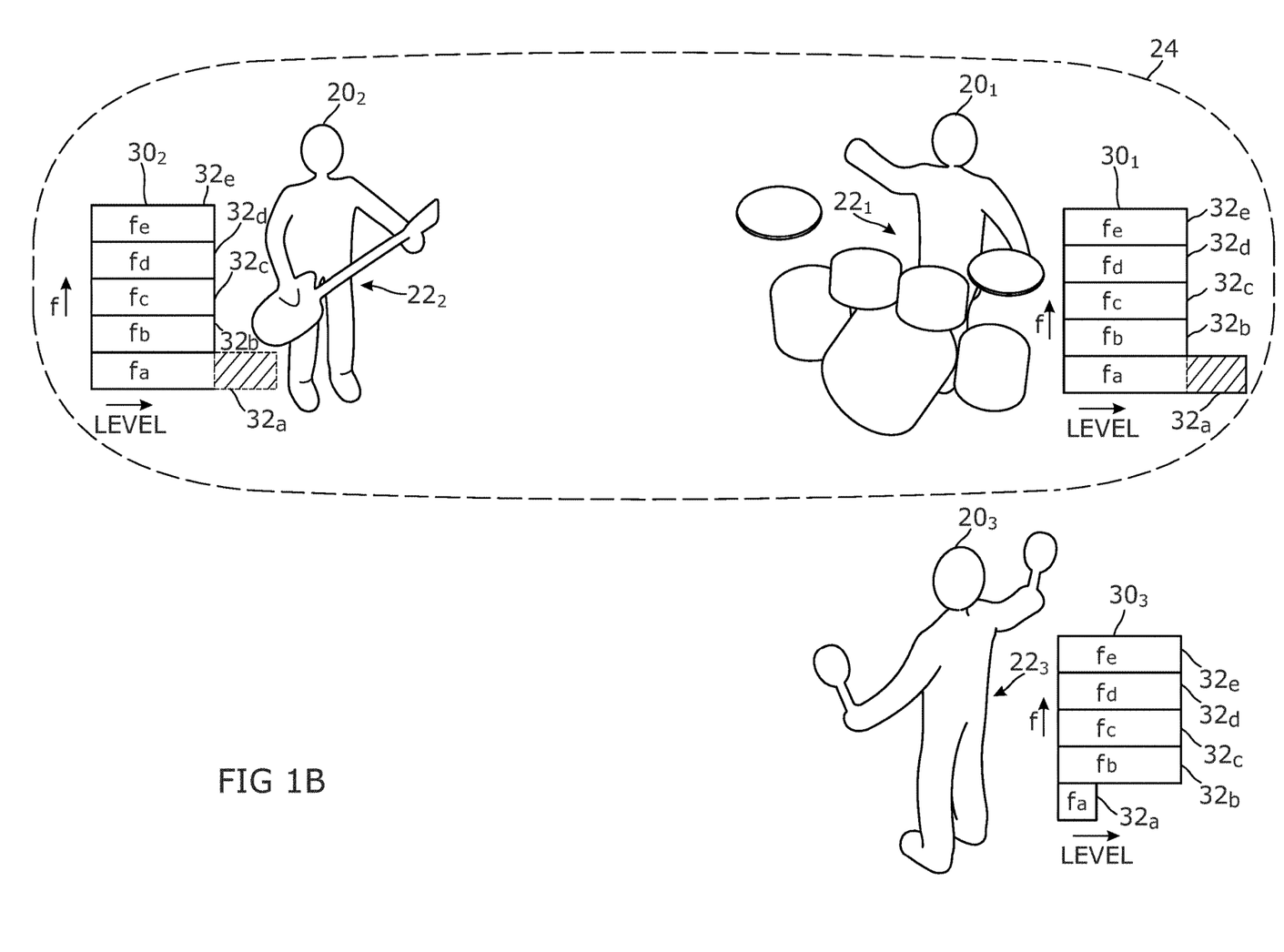

FIGS. 1A and 1B illustrate an example of a sound scene 10 comprising a plurality of spatial sound sources $20_n$. Spatial sound sources $20_n$ are associated with respective locations $22_n$ in the sound scene 10. For example, each of the spatial sound sources $20_n$ is at a location $22_n$ within the sound scene 10.

The spatial sound sources $20_n$ are illustrated visually for the purposes of explanation. However, it should be understood that they are not visible; although they may be associated with visible objects (as illustrated).

Sets $30_n$ of frequency-dependent levels $32_m$ are illustrated visually for the purposes of explanation. However, it should be understood that they are not visible in the sound scene 10; although they may be displayed in a user input interface, for example, in association with representations of the visible objects (as illustrated).

Sets $30_n$ of frequency-dependent levels $32_m$ are associated with respective spatial sound source $20_n$. For example, there is a set $30_n$ of frequency-dependent levels $32_m$ for each spatial sound source $20_n$. In this example, but not necessarily all examples, the frequency-dependent levels $32_m$ relate to the same frequency ranges $f_m$ for each spatial sound sources $20_n$. In this example, but not necessarily all examples, the frequency ranges $f_m$ are contiguous. The frequency-dependent levels $32_m$ can be different levels for different spatial sound sources $20_n$. For example, in FIG. 1A, the frequency-dependent level $32_a$ for the frequency range $f_a$ is higher for the spatial sound sources $20_1$, $20_2$ compared to that for spatial sound sources $20_2$.

If equalization is applied to the spatial sound sources $20_1$, $20_2$ (but not the spatial sound source $20_3$) a modified sound scene 10 is obtained, for example as illustrated in FIG. 1B. In FIG. 1B, the frequency-dependent levels $32_a$ for the frequency range $f_a$ for the spatial sound sources $20_1$, $20_2$ are adapted (increased in this example) and the frequency-dependent levels $32_a$ for the frequency range $f_a$ for the spatial sound source $20_3$ is not adapted (not increased in this example) or not adapted as much (increased in this example).

Figure 2:
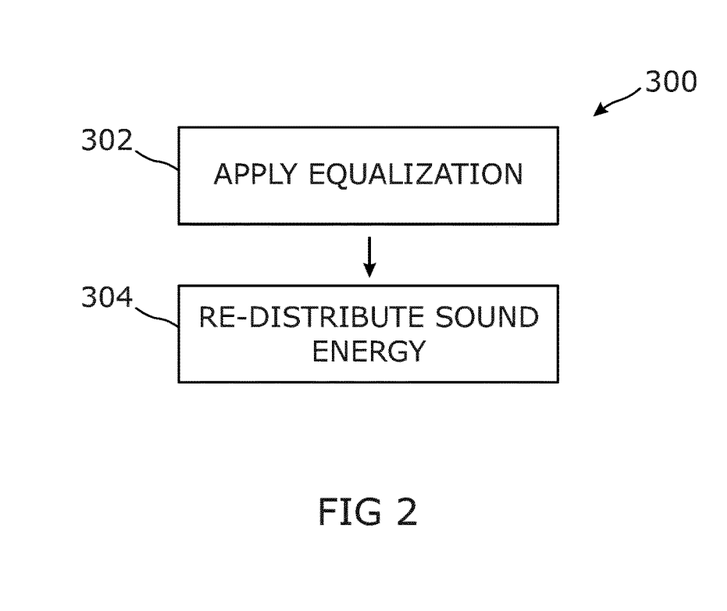
FIG. 2 shows another example embodiment of the subject matter described herein.

FIGS. 1A and 1B consequently illustrate a method, that is further illustrated in FIG. 2.

In FIG. 2, the method 300 comprises: at block 302 applying equalization to a sub-set 24 {spatial sound sources $20_1$, $20_2$} of a plurality of spatial sound sources 20, comprised in a sound scene 10, to modify the sound scene 10. Spatial sound sources $20_n$ are associated with respective locations $22_n$ in the sound scene 10. For example, each spatial sound source 20 is associated with a location 22 in the sound scene 10. Equalization comprises frequency-dependent level adaptation. The sub-set 24 comprises multiple spatial sound sources 20 but does not comprise all of the plurality of spatial sound sources 20. The sub-set 24 in the example of FIG. 1B comprises the spatial sound sources $20_1$, $20_2$ and excludes the spatial sound source $20_3$.

Applying equalization to the sub-set 24 of the plurality of spatial sound sources 20 can, for example, comprise adjusting a balance between frequency-dependent levels $32_m$ of frequency components $f_m$ of the sub-set 24 of the plurality of spatial sound sources 20.

In some but not necessarily all examples, applying equalization to the sub-set 24 of the plurality of spatial sound sources 20 comprises applying a common (shared) equalization to the sub-set 24 of spatial sound sources 20. For example, the frequency-dependent level $32_a$ for the frequency range $f_a$ for the spatial sound source $20_1$ ($L_{a1}$) and the frequency-dependent level $32_a$ for the frequency range $f_a$ for the spatial sound source $20_2$ ($L_{a2}$) can be adapted by the same absolute value X. Thus $L_{a1}$ (after equalization)=$L_{a1}$ (before equalization)+X and $L_{a2}$ (after equalization)=$L_{a2}$ (before equalization)+X. Levels in the above are expressed in decibels. The adaptation can be positive (increasing or emphasizing) or negative (decreasing or de-emphasizing).

Figure 3A:
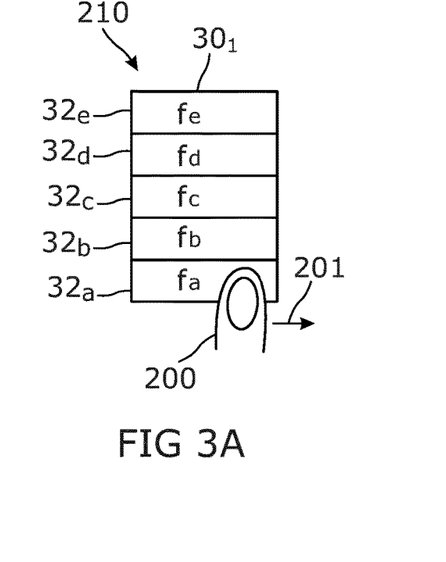
FIGS. 3A and 3B show another example embodiment of the subject matter described herein.
Figure 3B:
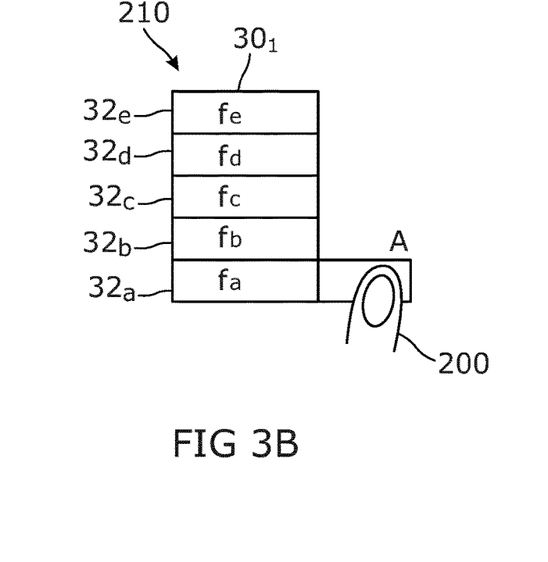

In some but not necessarily all examples, the sub-set 24 of the plurality of spatial sound sources 20 is selected from the plurality of spatial sound sources 20 in dependence upon a user input 200. FIGS. 3A and 3B illustrate an example of a user input 200.

In this example a user input interface 210 displays a representation of the set $30_1$ of frequency-dependent levels $32_m$ for a spatial sound source $20_1$. Representations of the sets $30_n$ of frequency-dependent levels $32_m$ can be associated with respective spatial sound sources $20_n$. For example, a representation of the set $30_i$ of frequency-dependent levels $32_m$ can, in some examples, be displayed for each spatial sound source $20_n$.

In this example, the user input interface 210 comprises a touch sensitive display. The user selects a particular frequency-dependent level $32_a$ in a particular set $30_1$ of frequency-dependent levels 32 associated with a particular spatial sound source $20_1$.

The user then drags 201 the frequency-dependent level $32_a$ to a desired adapted value A. The desired adapted value A will be the value of the frequency-dependent level $32_a$ for the spatial sound source $20_1$ after applying equalization to the sub-set 24 of the plurality of spatial sound sources 20.

In some examples, the user selects in the user input interface 210 of the touch sensitive display a location $22_1$ of a spatial sound source $20_1$ in the sound scene 10 or a displayed representation of the spatial sound source $20_1$ in the sound scene 10. In response, the user input interface 210 displays the set $30_1$ of frequency-dependent levels $32_m$ associated with that spatial sound source $20_1$. The user can then select and drag a representation of the frequency-dependent level $32_i$ of the set $30_j$ to a desired adapted value.

In these examples, the user input 200 comprises an indication of a spatial sound source 20 or a location 22 and comprises an indication of frequency (user selection of a representation of the frequency-dependent level 32). In this example, the user input also comprises an indication of emphasis (increase the level) or de-emphasis (decrease the level) and in addition provides for control of the amount of emphasis (level increase) or amount of de-emphasis (level decrease). However, in other examples, the indication of emphasis or de-emphasis can have a pre-programmed default value and sense.

In these examples, the user input indicates directly (by selecting the representation of the spatial sound source $20_1$) or indirectly (by selecting a location $22_1$ in the sound scene 10 associated with the spatial sound source $20_1$) a spatial sound source $20_1$ having a first characteristic. The sub-set 24 of the plurality of spatial sound sources 20 is selected to have the first characteristic in common. The sub-set comprises spatial sound source $20_1$, $20_2$ in FIG. 1B. The other un-selected spatial sound sources 20 of the plurality of spatial sound sources 20 that are not selected for the first sub-set 24 do not have the first characteristic. The other un-selected spatial sound source is spatial sound source $20_3$ in FIG. 1B.

In the example of FIG. 1B, the first characteristic is that frequency-dependent level $32_a$ for frequency range $f_a$ has a level greater than a threshold value T. The spatial sound sources $20_1$, $20_2$ in the sub-set 24 have a frequency-dependent level $32_a$ for frequency range $f_a$ greater than the threshold value T whereas the spatial sound source $20_3$ (not in the sub-set 24) has a frequency-dependent level $32_a$ for frequency range $f_a$ less than the threshold value T. The first characteristic is therefore that the spatial sound source 20 has a frequency-specific volume greater than a threshold value T.

The first characteristic can, for example, be dependent upon user input.

For example, the user indication of frequency (user selection of a representation of the frequency-dependent level $32_i$ indicates the frequency range $f_i$) can for example specify a first parameter, the frequency $f_i$, of the first characteristic.

The first characteristic can be dependent upon a user-selected spatial sound source 20.

For example, if the user input 200 additionally provides an indication of emphasis (increase the level) or de-emphasis (decrease the level) and in addition provides for control of the amount of emphasis (level increase) or amount of de-emphasis (level decrease), then this information can specify a second parameter, the level threshold T, of the first characteristic. The level threshold T can for example be set to a value similar to the level L before user adaptation or some percentage of that level. For example, when the level is increased by equalization the threshold T=L(before equalization)*p, where p is less than 1 (e.g. 0.7 or 0.8). The threshold needs to be exceeded in the positive sense i.e. the level for the other spatial sound sources 20 in the sub-set 24 needs to be greater than the threshold T. For example, when the level is decreased by equalization the threshold T=L (before equalization)*p, where p is greater than 1 (e.g. 1.2 or 1.3) when the level is decreased by equalization. The threshold needs to be exceeded in the negative sense i.e. the level for the other spatial sound sources 20 in the sub-set 24 needs to be less than the threshold T.

The sub-set 24 of the plurality of spatial sound sources 20 can be selected automatically or semi-automatically following the user input 200.

The equalization applied to the sub-set 24 of the spatial sound sources 20 changes the spatial distribution of sound energy in the sound scene 10. In some but not necessarily all examples, the method 300 comprises, at block 304 in FIG. 2, spatially re-distributing sound energy to, at least partially, spatially compensate for equalization of the sub-set 24 of spatial sound sources 20.

Figure 4A:
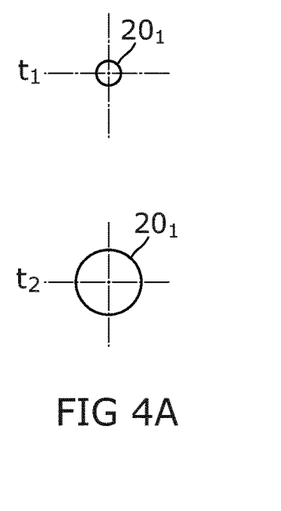
FIG. 4A, 4B, 4C shows other example embodiments of the subject matter described herein.

Equalization applied to a target spatial sound source 20 in the sub-set 24 has an effect on perceived location of that target spatial sound source 20. The method 300, at block 304, can comprise one of more steps to ameliorate this effect For example, block 304 can comprise adapting one or more characteristics of the target spatial sound source 20. In some examples, this comprises adapting one or more spatial sound sources 20 in the sub-set 24 of the plurality of spatial sound sources to make them more diffuse. FIG. 4A illustrates the effect of making a spatial sound source 20 more diffuse.

The spatial sound source is less localized and is spread over a larger region of the sound scene 10. In the limit, it can be entirely diffuse, that is, ambient sound.

Figure 4B:
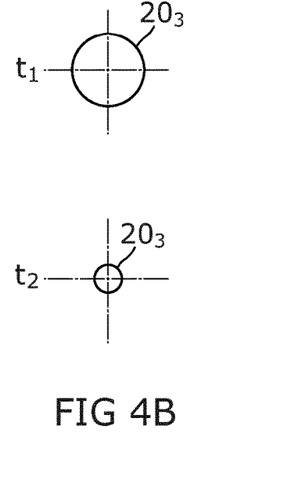
Figure 4C:
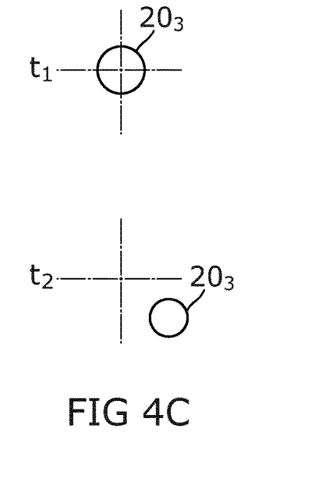

Additionally or alternatively, block 304 can comprise adapting one or more characteristics of one or more of the plurality of spatial sound sources 20 that are not comprised in the sub-set 24 of the plurality of spatial sound sources 20. In some examples, block 304 comprises adapting one or more of the plurality of spatial sound sources 20 that are not in the sub-set 24 of the plurality of spatial sound sources to make the one or more spatial sound sources less diffuse. FIG. 4B illustrates the effect of making a spatial sound source 20 less diffuse. The spatial sound source is more localized and is spread over a smaller region of the sound scene 10. In some examples, block 304 additionally or alternatively comprises changing a location 22 of the one or more spatial sound sources 20. FIG. 4C illustrates the effect of changing a location of a spatial sound source 20.

Figure 5A:
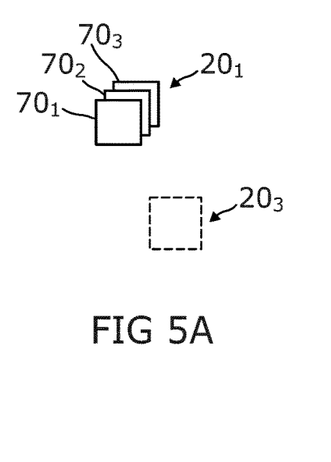
FIG. 5A, 5B, 5C show another example embodiment of the subject matter described herein.

FIG. 5A illustrates a representation of each spatial sound source 20 as spatially located time-frequency tiles $70_i$. The audio signal representing the spatial sound source 20 is time-divided, then frequency divided to form time-frequency tiles.

Figure 5B:
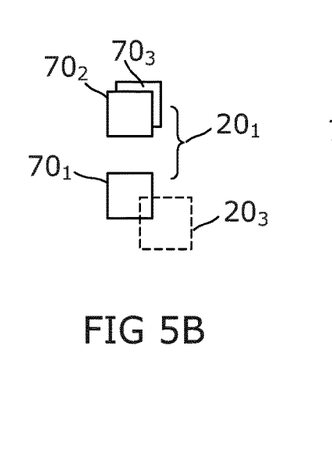
Figure 5C:
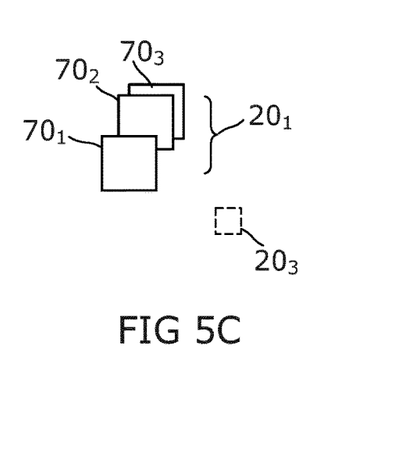

Each of FIGS. 5A, 5B and 5C illustrates a number of contemporaneous (same time period) time-frequency tiles 70 for the same spatial sound source. In each of FIGS. 5A, 5B and 5C the time-frequency tiles 70 for the same spatial sound source are separately located in the sound scene 10.

FIG. 5A illustrates a spatial distribution of the time-frequency tiles 70 at a time t1 before equalization. FIG. 5B illustrates the spatial distribution of the time-frequency tiles 70 at a time after equalization (before amelioration) e.g. after block 302 but before block 304. FIG. 5C illustrates the spatial distribution of the time-frequency tiles 70 at a time after equalization and amelioration e.g. after block 304.

The effect of equalization is illustrated in FIG. 5B. There has been spatial separation of the time-frequency tiles 70 as a consequence of equalization. The spatial separation could result in a single spatial sound source $20_1$ being perceived as two distinct spatial sound sources 20. The spatial separation could result in the spatial sound source $20_1$ becoming spatially indistinct from another spatial sound source $20_3$ from which it was spatially distinct before equalization (FIG. 5A). The spatial separation could result in the spatial sound source $20_1$ becoming spatially indistinct because it overlaps or comes close to the other spatial sound source $20_3$.

The effect of amelioration can be understood by comparing FIG. 5B and FIG. 5C.

The spatial separation of the time-frequency tiles 70 has been ameliorated by diffusing some or all of the time-frequency tiles 70 associated with the spatial sound source $20_1$. This prevents the single spatial sound source $20_1$ being perceived as two (or more) distinct spatial sound sources 20.

The spatial sound source $20_1$ has been kept distinct from the other spatial sound source $20_3$ (from which it was spatially distinct before equalization) by making the other spatial sound source $20_3$ less diffuse (more limited in spatial extent), for example, by making one, some or all of the time-frequency tiles 70 associated with the other spatial sound source $20_3$ less diffuse (more limited in spatial extent).

The spatial sound source $20_1$ has been kept distinct from the other spatial sound source $20_3$ (from which it was spatially distinct before equalization) by re-locating the other spatial sound source $20_3$, for example, by moving one, some or all of the time-frequency tiles 70 associated with the other spatial sound source $20_3$.

The above methods can thus prevent a time-frequency tile 70 from becoming spatially separated or distinct from other contemporaneous time-frequency tiles of the same spatial sound source 20; and/or prevent spatial overlap of a distinctly located time-frequency tile 70 of a spatial sound source $20_1$ with other distinctly located contemporaneous time-frequency tiles 50 of one or more other spatial sound sources $20_3$.

A beamforming algorithm (e.g. vector-based amplitude panning) can be used to estimate how a time-frequency tile representation of a spatial sound source 20 is re-located as a consequence of increasing a level associated with the time-frequency tile. The time-frequency tile can be modelled as a weighted linear combination of audio signals at audio transducers. Increasing the level, decreases the distance from the audio transducers to the spatial sound source (audio intensity scales as an inverse square law). The impact of the change in those distances on the location of the spatial sound source can be calculated.

Figure 6:
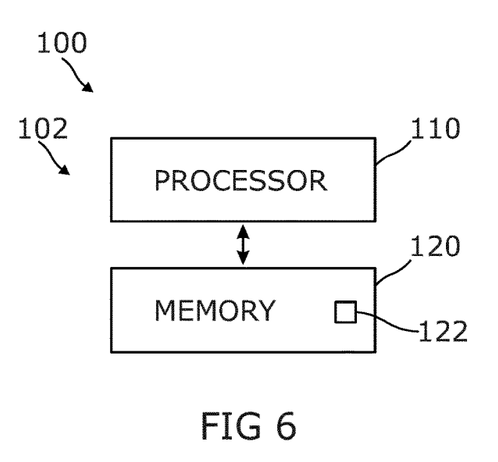
FIG. 6 shows another example embodiment of the subject matter described herein.

FIG. 6 illustrates an example of a controller 102. Implementation of a controller 102 may be as controller circuitry. The controller 102 may be implemented in hardware alone, have certain aspects in software including firmware alone or can be a combination of hardware and software (including firmware).

As illustrated in FIG. 6 the controller 102 may be implemented using instructions that enable hardware functionality, for example, by using executable instructions of a computer program 122 in a general-purpose or special-purpose processor 110 and that may be stored on a computer readable storage medium (disk, memory etc.) to be executed by such a processor 110.

The processor 110 is configured to read from and write to the memory 120. The processor 110 may also comprise an output interface via which data and/or commands are output by the processor 110 and an input interface via which data and/or commands are input to the processor 110.

The memory 120 stores a computer program 122 comprising computer program instructions (computer program code) that controls the operation of the apparatus 100 when loaded into the processor 110. The computer program instructions, of the computer program 122, provide the logic and routines that enables the apparatus to perform the methods illustrated in FIG. 2. The processor 110 by reading the memory 120 is able to load and execute the computer program 122.

The apparatus 100 therefore comprises:
at least one processor 110; and
at least one memory 120 including computer program code the at least one memory 120 and the computer program code configured to, with the at least one processor 110, cause the apparatus 100 at least to perform:
applying equalization to a sub-set 24 {spatial sound sources $20_1$, $20_2$} of a plurality of spatial sound sources 20, comprised in a sound scene 10, to modify the sound scene 10, wherein each spatial sound source 20 is associated with a location 22 in the sound scene 10, wherein equalization comprises frequency-dependent level adaptation, and wherein the sub-set 24 comprises multiple spatial sound sources 20 but does not comprise all of the plurality of spatial sound sources 20.

Figure 7:
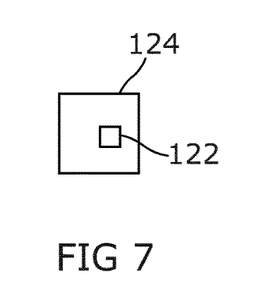
FIG. 7 shows another example embodiment of the subject matter described herein.

As illustrated in FIG. 7, the computer program 122 may arrive at the apparatus 100 via any suitable delivery mechanism 124. The delivery mechanism 124 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 122. The delivery mechanism may be a signal configured to reliably transfer the computer program 122. The apparatus 100 may propagate or transmit the computer program 122 as a computer data signal.

Computer program instructions for causing an apparatus to perform at least the following or for performing at least the following:

applying equalization to a sub-set 24 {spatial sound sources $20_1$, $20_2$} of a plurality of spatial sound sources 20, comprised in a sound scene 10, to modify the sound scene 10, wherein each spatial sound source 20 is associated with a location 22 in the sound scene 10, wherein equalization comprises frequency-dependent level adaptation, and wherein the sub-set 24 comprises multiple spatial sound sources 20 but does not comprise all of the plurality of spatial sound sources 20.

The computer program instructions may be comprised in a computer program, a non-transitory computer readable medium, a computer program product, a machine readable medium. In some but not necessarily all examples, the computer program instructions may be distributed over more than one computer program.

Although the memory 120 is illustrated as a single component/circuitry it may be implemented as one or more separate components/circuitry some or all of which may be integrated/removable and/or may provide permanent/semi-permanent/dynamic/cached storage.

Although the processor 110 is illustrated as a single component/circuitry it may be implemented as one or more separate components/circuitry some or all of which may be integrated/removable. The processor 110 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIG. 2 may represent steps in a method and/or sections of code in the computer program 122. The illustration of a particular order to the blocks does not necessarily imply that there is a required or preferred order for the blocks and the order and arrangement of the block may be varied. Furthermore, it may be possible for some blocks to be omitted.

The apparatus 100 can be configured for capturing and/or processing and/or rendering the sound scene 10.

Figure 8A:
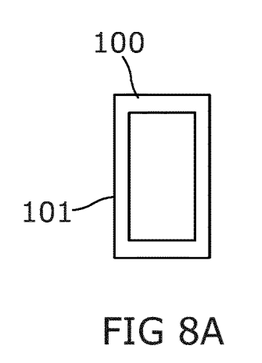
FIG. 8A, 8B, 8C show other example embodiments of the subject matter described herein.
Figure 8B:
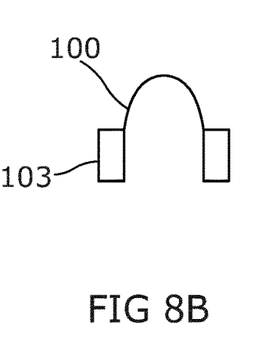
Figure 8C:
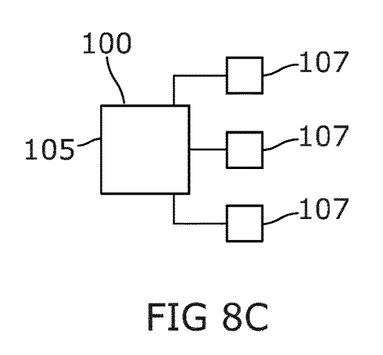

As illustrated in FIG. 8A, the apparatus 100 can be configured as a spatial sound capturing device, such a camera phone. As illustrated in FIG. 8B, the apparatus 100 can be configured as headphones 103. As illustrated in FIG. 8C, the apparatus 100 can be configured as a controller 105 for multiple loudspeakers 107.

In an alternative implementation, block 302 of the method 300 comprises:

applying equalization to at least one of a plurality of spatial sound sources 20, comprised in a sound scene 10, to modify the sound scene 10, wherein each spatial sound source 20 is associated with a location 22 in the sound scene 10;

wherein equalization comprises a frequency-dependent level filter; and block 304 comprises spatially re-distributing sound energy to spatially compensate for equalization of the at least one of the plurality of spatial sound sources.

In one implementation, applying equalization to at least one of a plurality of spatial sound sources 20 comprises applying equalization to all of the plurality of spatial sound sources 20.

In another implementation, applying equalization to at least one of a plurality of spatial sound sources 20 comprises applying equalization to only one of the plurality of spatial sound sources 20.

In a further implementation, applying equalization to at least one of a plurality of spatial sound sources 20 comprises applying equalization to a sub-set 24 of the plurality of spatial sound sources 20, wherein the sub-set 24 comprises multiple spatial sound sources 20 but does not contain all of the plurality of spatial sound sources 20.

Sound Sources

Spatial sound sources 20 can, for example, be defined using channel-based audio, for example, n.m surround sound (e.g. 5.1, 7.1 or 22.2 surround sound) or binaural audio, or scene-based audio, including spatial information about a sound field and sound sources.

Audio content may encode spatial audio as audio sources. Examples include but are not limited to MPEG-4 and MPEG SAOC. MPEG SAOC is an example of metadata-assisted spatial audio.

Audio content may encode spatial audio as audio sources in the form of moving virtual loudspeakers.

Audio content may encode spatial audio including sound sources as audio signals with parametric side information or metadata. The audio signals can be, for example, First Order Ambisonics (FOA) or its special case B-format, Higher Order Ambisonics (HOA) signals or mid-side stereo. For such audio signals, synthesis which utilizes the audio signals and the parametric metadata is used to synthesize the audio scene so that a desired spatial perception is created.

The audio content encoded may be speech and/or music and/or generic audio.

3GPP IVAS (3GPP, Immersive Voice and Audio services), which currently under development, is expected to support new immersive voice and audio services, for example, mediated reality.

A spatial sound source may be re-located by mixing a direct form of the source (an attenuated and directionally-filtered direct sound) with an indirect form of the source (e.g. positioned directional early reflections and/or diffuse reverberant).

A spatial sound source may be widened or narrowed by spreading time-frequency tiles representing the spatial sound source over a wider or narrower area. The time-frequency tiles can be located or re-located as described for a spatial sound source in the preceding paragraph.

Spatial sound sources can be defined as sound objects. A sound object is a data structure with metadata defining a location.

Where a structural feature has been described, it may be replaced by means for performing one or more of the functions of the structural feature whether that function or those functions are explicitly or implicitly described.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' relates to temporary recording of the data. The use of the term 'store' in relation to an image relates to permanent recording of the data. Where the term 'capture' or 'capturing' is used in the description it can be replaced by 'store' or 'storing', and vice versa.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory
   storing instructions that when executed by the at least one processor, cause the apparatus to perform:
   applying equalization to a sub-set of a plurality of spatial sound sources, comprised in a sound scene, to modify the sound scene,
   wherein spatial sound sources are associated with respective locations in the sound scene,
   wherein equalization comprises frequency-dependent level adaptation,
   wherein the sub-set comprises multiple spatial sound sources but does not comprise all of the plurality of spatial sound sources, and the sub-set is selected from the plurality of spatial sound sources in dependence upon a user input, wherein the user input indicates directly or indirectly a spatial sound source having a first characteristic,
   wherein the first characteristic is that the spatial sound source has a frequency-specific volume greater than a threshold value; and
   selecting the sub-set of the plurality of spatial sound sources to have the first characteristic.

2. An apparatus as claimed in claim 1, wherein the at least one memory is storing instructions that when executed by the at least one processor, cause the apparatus to apply a common equalization to the sub-set of spatial sound sources.

3. An apparatus as claimed in claim 1, wherein the user input comprises:
   an indication of a spatial sound source or a location;
   an indication of frequency; and, optionally,
   an indication of emphasis or de-emphasis.

4. An apparatus as claimed in claim 1, where the at least one memory is storing instructions that when executed by the at least one processor, cause the apparatus to perform spatially re-distributing sound energy to spatially compensate for equalization of the sub-set of spatial sound sources.

5. An apparatus as claimed in claim 1, where the at least one memory is storing instructions that when executed by the at least one processor, cause the apparatus to perform adapting one or more characteristics of a target spatial sound source and/or adapting one or more characteristics of one or more of the plurality of spatial sound sources that are not comprised in the sub-set of the plurality of spatial sound sources.

6. An apparatus as claimed in claim 1, where the at least one memory is storing instructions that when executed by the at least one processor, cause the apparatus to perform adapting one or more spatial sound sources in the sub-set of the plurality of spatial sound sources to make them more diffuse.

7. An apparatus as claimed in claim 1, where the at least one memory is storing instructions that when executed by the at least one processor, cause the apparatus to perform adapting one or more of the plurality of spatial sound sources that are not in the sub-set of the plurality of spatial sound sources to make the one or more sound sources less diffuse and/or to change a location of the one or more spatial sound sources.

8. An apparatus as claimed in claim 1, where the at least one memory is storing instructions that when executed by the at least one processor, cause the apparatus to perform representing spatial sound sources as respective spatially located time-frequency tiles, and preventing a time-frequency tile from becoming spatially separated or distinct from other contemporaneous time-frequency tiles of the same spatial sound source; and/or preventing spatial overlap of a distinctly located time-frequency tile with other distinctly located contemporaneous time-frequency tiles of other spatial sound sources.

9. An apparatus as claimed in claim 1, where the at least one memory is storing instructions that when executed by the at least one processor, cause the apparatus to perform capturing and/or processing and/or rendering the sound scene comprising the plurality of spatial sound sources, wherein spatial sound sources are associated with respective locations in the sound scene.

10. An apparatus as claimed in claim 1, configured as headphones, a controller for loudspeakers, or a spatial sound capturing device.

11. A method comprising:
    applying equalization to a sub-set of a plurality of spatial sound sources, comprised in a sound scene, to modify the sound scene,
    wherein spatial sound sources are associated with respective locations in the sound scene,
    wherein equalization comprises frequency-dependent level adaptation,
    wherein the sub-set comprises multiple spatial sound sources but does not comprise all of the plurality of spatial sound sources, and the sub-set is selected from the plurality of spatial sound sources in dependence upon a user input, wherein the user input indicates directly or indirectly a spatial source having a first characteristic;
    wherein the first characteristic is that the spatial sound source has a frequency-specific volume greater than a threshold value; and
    selecting the sub-set of the plurality of spatial sound sources to have the first characteristic.

12. A non-transitory program storage device encoded with a computer program that, when run on a computer, enables:
    applying equalization to a sub-set of a plurality of spatial sound sources, comprised in a sound scene, to modify the sound scene,
    wherein spatial sound sources are associated with respective locations in the sound scene,
    wherein equalization comprises frequency-dependent level adaptation,
    wherein the sub-set comprises multiple spatial sound sources but does not comprise all of the plurality of spatial sound sources, and the sub-set is selected from the plurality of spatial sound sources in dependence upon a user input, wherein the user input indicates directly or indirectly a spatial sound source having a first characteristic, wherein the first characteristic is that the spatial sound source has a frequency-specific volume greater than a threshold value; and selecting the sub-set of the plurality of spatial sound sources to have the first characteristic.

* * * * *